United States Patent
Saito

(10) Patent No.: US 11,754,250 B2
(45) Date of Patent: Sep. 12, 2023

(54) VEHICLE LAMP

(71) Applicant: Stanley Electric Co., Ltd., Tokyo (JP)

(72) Inventor: Keita Saito, Tokyo (JP)

(73) Assignee: STANLEY ELECTRIC CO., LTD., Tokyo (JP)

(*) Notice: Subject to any disclaimer, the term of this patent is extended or adjusted under 35 U.S.C. 154(b) by 22 days.

(21) Appl. No.: 17/619,609

(22) PCT Filed: Jun. 11, 2020

(86) PCT No.: PCT/JP2020/022972
§ 371 (c)(1),
(2) Date: Dec. 16, 2021

(87) PCT Pub. No.: WO2020/255845
PCT Pub. Date: Dec. 24, 2020

(65) Prior Publication Data
US 2022/0349548 A1 Nov. 3, 2022

(30) Foreign Application Priority Data
Jun. 20, 2019 (JP) .................. 2019-114755

(51) Int. Cl.
  *F21S 43/239* (2018.01)
  *F21S 43/249* (2018.01)
  *F21S 43/14* (2018.01)
  *F21Y 115/10* (2016.01)

(52) U.S. Cl.
  CPC ............ *F21S 43/239* (2018.01); *F21S 43/14* (2018.01); *F21S 43/249* (2018.01); *F21Y 2115/10* (2016.08)

(58) Field of Classification Search
  CPC ......... F21S 43/249; F21S 43/239; F21S 43/14
  See application file for complete search history.

(56) References Cited

U.S. PATENT DOCUMENTS

| 10,648,637 B1* | 5/2020 | Floc'h ................. F21S 43/239 |
| 10,895,361 B1* | 1/2021 | Crespin ............... B60Q 1/2607 |
| 10,962,194 B1* | 3/2021 | Hemon .................. F21S 41/24 |

(Continued)

FOREIGN PATENT DOCUMENTS

| CN | 108873142 A | 11/2016 |
| CN | 206724036 U | 12/2017 |

(Continued)

OTHER PUBLICATIONS

Extended European Search Report for the related European Patent Application No. 20826209.7 dated Oct. 18, 2022.

(Continued)

*Primary Examiner* — Christopher E Dunay
(74) *Attorney, Agent, or Firm* — Kenealy Vaidya LLP

(57) ABSTRACT

A second light source, a second incidence section and a second reflecting section in a vehicle lamp are disposed closer to a light guide section than a first light source, a first incidence section and a first reflecting section, a stepped section is provided between the first reflecting section and the second reflecting section, and the first reflecting section is disposed at above the stepped section and the second reflecting section is disposed at below the stepped section when seen from a side of the first incidence section and a side of the second incidence section.

12 Claims, 11 Drawing Sheets

(56) References Cited

U.S. PATENT DOCUMENTS

| | | | |
|---|---|---|---|
| 2015/0267895 A1 | 9/2015 | Kono | |
| 2015/0277027 A1* | 10/2015 | Koizumi | F21S 43/247 |
| | | | 362/511 |
| 2017/0205044 A1 | 7/2017 | Tokieda et al. | |
| 2017/0336041 A1* | 11/2017 | Mochizuki | F21S 41/24 |
| 2019/0093847 A1* | 3/2019 | Okada | F21S 43/243 |
| 2019/0154228 A1* | 5/2019 | Xiang | F21S 41/285 |
| 2020/0018457 A1* | 1/2020 | Enomoto | F21S 43/40 |
| 2022/0397251 A1* | 12/2022 | Gloss | F21S 41/33 |
| 2023/0003355 A1* | 1/2023 | Kanezuka | F21S 41/50 |
| 2023/0066763 A1* | 3/2023 | Han | F21S 43/247 |

FOREIGN PATENT DOCUMENTS

| | | |
|---|---|---|
| CN | 207555467 U | 6/2018 |
| DE | 102015204747 A1 | 9/2016 |
| FR | 2966223 A1 | 4/2012 |
| FR | 3042258 A1 | 4/2017 |
| JP | 2016-181364 A | 10/2016 |
| JP | 2017-212066 A | 11/2017 |
| WO | 2020/255845 A1 | 12/2020 |

OTHER PUBLICATIONS

International Search Report and Written Opinion of the International Search Report for PCT/JP2020/022972 dated Jul. 21, 2020.

* cited by examiner

VEHICLE LAMP

This application is a U.S. National Stage Application under 35 U.S.C § 371 of International Patent Application No. PCT/JP2020/022972 filed Jun. 11, 2020, which claims the benefit of priority to Japanese Patent Application No. 2019-114755 filed Jun. 20, 2019, the disclosures of all of which are hereby incorporated by reference in their entireties.

TECHNICAL FIELD

The present invention relates to a vehicle lamp.
Priority is claimed on Japanese Patent Application No. 2019-114755, filed Jun. 20, 2019, the content of which is incorporated herein by reference.

BACKGROUND ART

In the related art, as a vehicle lamp mounted on a vehicle, a combination of a light source such as a light emitting diode (LED) or the like and a light guide body such as an inner lens or the like is known (for example, see the following Patent Literature 1).

In such a vehicle lamp, light emitted from the light source is incident into the light guide body from a base end side of the light guide body, and guided toward a tip side of the light guide body while repeating reflection of the light inside of the light guide body. In addition, the light reflected by a plurality of reflection cuts provided on a back surface side of the light guide body is emitted toward the outside from a front surface side of the light guide body. Accordingly, it is possible to make the front surface side of the light guide body emit light as a light emitting section of the vehicle lamp.

In addition, in a vehicle lamp in recent years, due to diversification of designs, light guide bodies have been made to emit light from light sources with different colored lights. As a combination of such vehicle lamps, for example, there is a combination of width indicators (position lamps) configured to emit white light and direction indicators (turn lamps) configured to emit orange light as vehicle lamps mounted on both corner portions of a front end side of the vehicle, and a combination of taillights (tail lamps) configured to emit red light and direction indicators (turn lamps) configured to emit orange light as vehicle lamps mounted on both corner portion of a rear end side of the vehicle.

CITATION LIST

Patent Literature

[Patent Literature 1]
Japanese Unexamined Patent Application, First Publication No. 2016-181364

SUMMARY OF INVENTION

Technical Problem

Incidentally, when light guide bodies emit light using light from light sources with different colored lights, it is necessary to arrange the light sources with different colored lights, cause the light from the light sources to enter the light guide body from different positions of the light guide body, and then, guide the lights toward each other in the same direction.

However, the light incident from different positions of the light guide body is emitted from different positions of the light guide body. In this case, when switching the turned on light sources, positional deviation of bright spots of each luminescent color seen from the front surface side of the light guide body occurs, and uneasy feeling may be felt.

An aspect of the present invention is directed to provide a vehicle lamp capable of emitting light, which has entered a light guide body from different positions of the light guide body, from a same position of the light guide body.

Solution to Problem

An aspect of the present invention provides the following configurations.

(1) A vehicle lamp including:
a first light source and a second light source disposed next to each other; and
a light guide body configured to guide light from the first light source and the second light source in a same direction with each other,
wherein the light guide body includes:
a first incidence section and a second incidence section that are disposed to face the first light source and the second light source, respectively, and from which light emitted from the first light source and the second light source enters inside;
a first reflecting section and a second reflecting section that are disposed to face the first incidence section and the second incidence section, respectively, and that are configured to reflect the light entered from the first incidence section and the second incidence section;
a light guide section configured to guide the light reflected at the first reflecting section and the second reflecting section;
a light guide reflecting section that is disposed on a back surface side of the light guide section and that is configured to reflect the light reflected at the first reflecting section and the second reflecting section toward a front surface side of the light guide section; and
an emission section that is disposed at the front surface side of the light guide section and that is configured to emit the light reflected at the light guide reflecting section to an outside,
the second light source, the second incidence section and the second reflecting section are disposed closer to the light guide section compared to the first light source, the first incidence section and the first reflecting section,
a stepped section is provided between the first reflecting section and the second reflecting section, and
when seen from a side of the first incidence section and a side of the second incidence section, the first reflecting section is disposed at above the stepped section and the second reflecting section is disposed at below the stepped section.

(2) The vehicle lamp according to the above-mentioned (1), wherein the first reflecting section includes a first reflecting surface inclined toward the back surface side of the light guide body with respect to an optical axis of light entered from the first incidence section, a second reflecting surface inclined toward a front surface side of the light guide body with respect to the optical axis of light entered from the first incidence section and a third reflecting surface inclined toward the light guide section with respect to the optical axis of light entered from the first incidence section, and among the light entered from the first incidence section, first light entered the first reflecting surface is reflected toward the back surface side of the light guide body, second light entered the second reflecting surface is reflected toward the front surface side of the light guide body, and third light entered the third reflecting surface is reflected toward the back surface side of the light guide section.

(3) The vehicle lamp according to the above-mentioned (2), wherein the first reflecting section includes a fourth reflecting surface configured to reflect the first light reflected at the first reflecting surface toward the back surface side of the light guide section, and a fifth reflecting surface configured to reflect the second light reflected by the second reflecting surface toward the back surface side of the light guide section.

(4) The vehicle lamp according to the above-mentioned (3), wherein the first reflecting section includes a sixth reflecting surface configured to reflect some of the first light reflected at the fourth reflecting surface toward the front surface side of the light guide section.

(5) The vehicle lamp according to the above-mentioned (4), wherein the sixth reflecting surface has a light diffusion shape configured to reflect and diffuse the first light entered the sixth reflecting surface.

(6) The vehicle lamp according to any one of the above-mentioned (1) to (5), wherein the second reflecting section includes a first reflecting surface inclined toward the back surface side of the light guide body with respect to an optical axis of light entered from the second incidence section, a second reflecting surface inclined toward the front surface side of the light guide body with respect to the optical axis of light entered from the second incidence section, and a third reflecting surface inclined toward the light guide section with respect to the optical axis of light incident from the second incidence section.

(7) The vehicle lamp according to the above-mentioned (6), wherein, among the light entered from the second incidence section, fourth light entered the first reflecting surface is reflected toward the back surface side of the light guide body, fifth light entered the second reflecting surface is reflected toward a front surface side of the light guide body, and sixth light entered the third reflecting surface is reflected toward the back surface side of the light guide section.

(8) The vehicle lamp according to the above-mentioned 6, wherein, among the light entered from the second incidence section, fourth light entered the first reflecting surface is reflected toward the back surface side of the light guide body, fifth light entered the second reflecting surface is reflected toward the front surface side of the light guide body, and sixth light entered the third reflecting surface is reflected toward the back surface side of the light guide section.

(9) The vehicle lamp according to the above-mentioned (8), wherein the second reflecting surface has a light diffusion shape configured to reflect and diffuse the fifth light entered the second reflecting surface.

(10) The vehicle lamp according to any one of the above-mentioned (7) to (9), wherein the second reflecting section includes a fourth reflecting surface configured to reflect fourth light reflected at the first reflecting surface toward the back surface side of the light guide section, and a fifth reflecting surface configured to reflect fifth light reflected at the second reflecting surface toward the back surface side of the light guide section.

(11) The vehicle lamp according to any one of the above-mentioned (1) to (10), wherein the first light source and the second light source emit colored lights different from each other.

(12) The vehicle lamp according to any one of the above-mentioned (1) to (11), wherein the light guide body has a plurality of light guide lens sections including the first and second incidence sections, the first and second reflecting sections, the light guide section, the light guide reflecting section, and the emission section, and the plurality of light guide lens sections constitute a continuous emission section in which the neighboring light guide sections are formed integrally and the respective emission sections are made continuous with each other in a state the plurality of light guide lens are arranged in a vehicle width direction.

Advantageous Effects of Invention

According to the aspect of the present invention, it is possible to provide a vehicle lamp capable of emitting light, which has entered a light guide body from different positions of the light guide body, from a same position of the light guide body.

DESCRIPTION OF EMBODIMENTS

Figure 1:
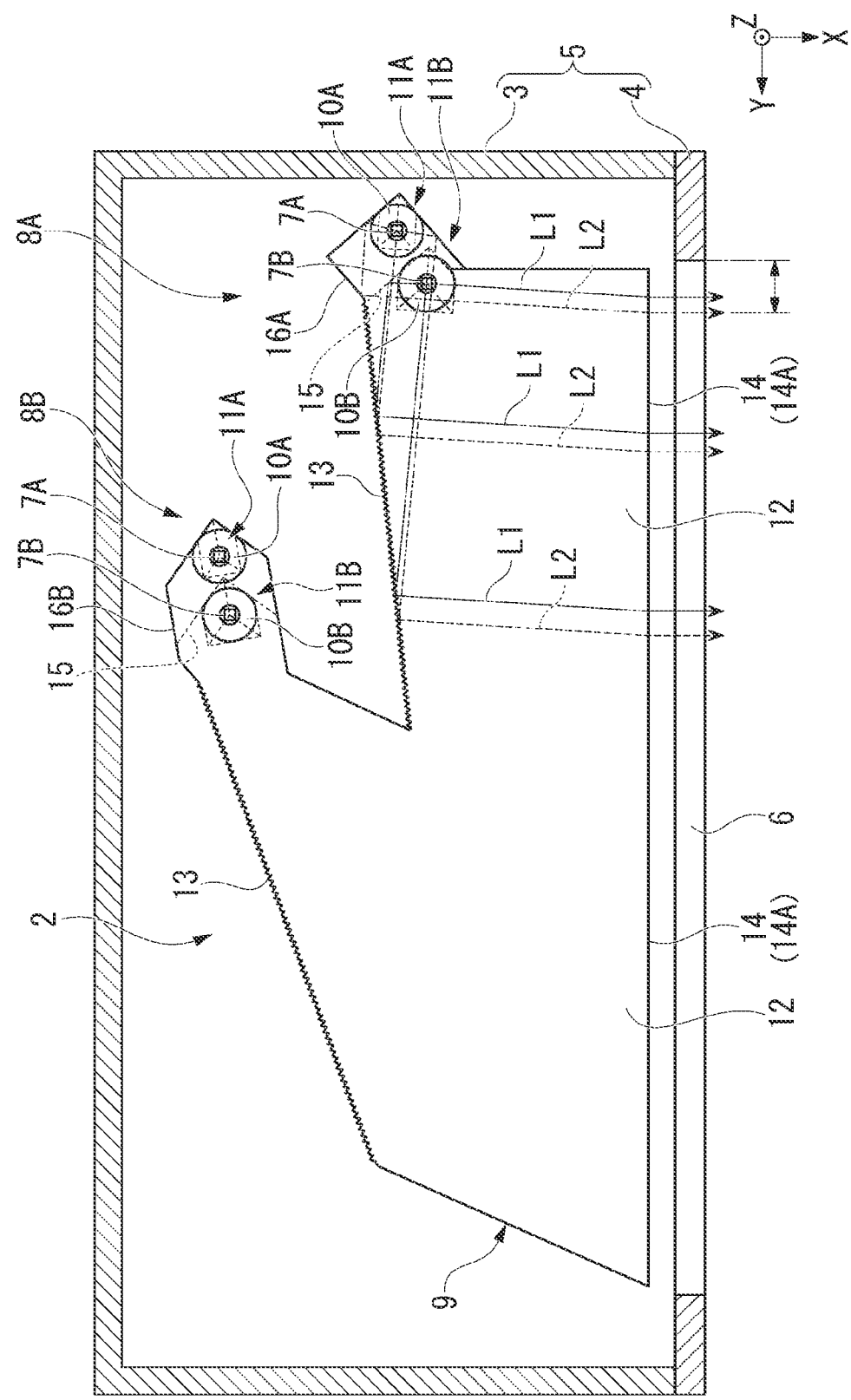
FIG. 1 is a plan view showing a configuration of a vehicle lamp according to an embodiment of the present invention.

Hereinafter, an embodiment of the present invention will be described with reference to the accompanying drawings.

Further, in the drawings used in the following description, in order to make components easier to see, scales of dimensions may be shown differently depending on the components, and dimensional ratios or the like of the components are not always the same as the actual ones.

As an embodiment of the present invention, for example, a vehicle lamp 1 shown in FIG. 1 to FIG. 11 will be described.

Figure 2:
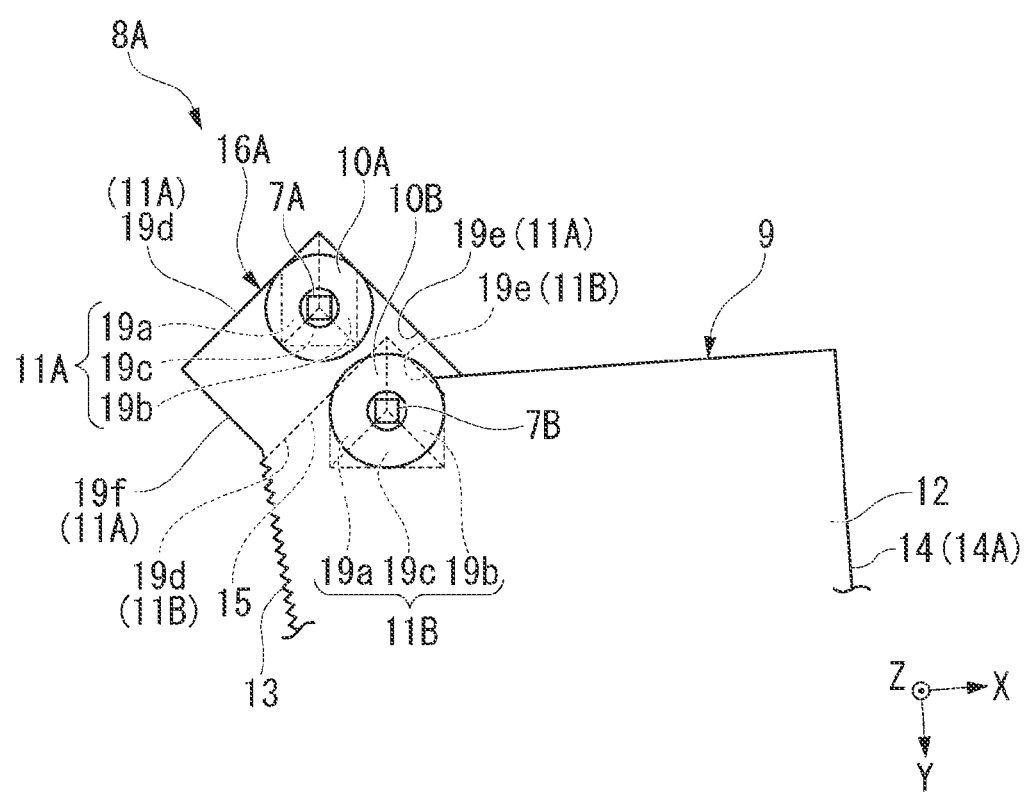
FIG. 2 is a plan view showing a configuration of the vehicle lamp on the side of a first light guide lens section shown in FIG. 1.
Figure 3:
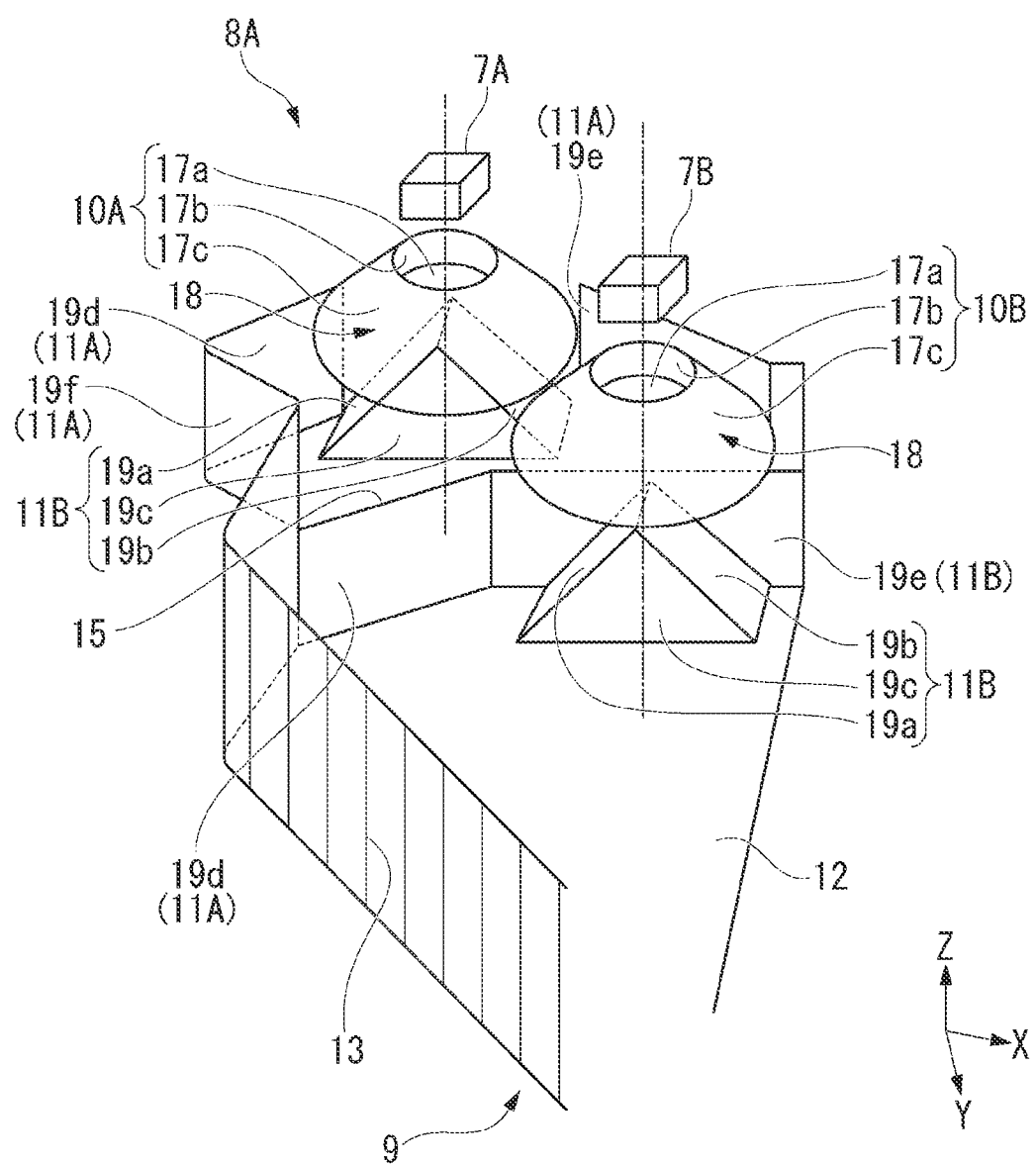
FIG. 3 is a perspective view showing a configuration of the first light guide lens section shown in FIG. 2.
Figure 4:
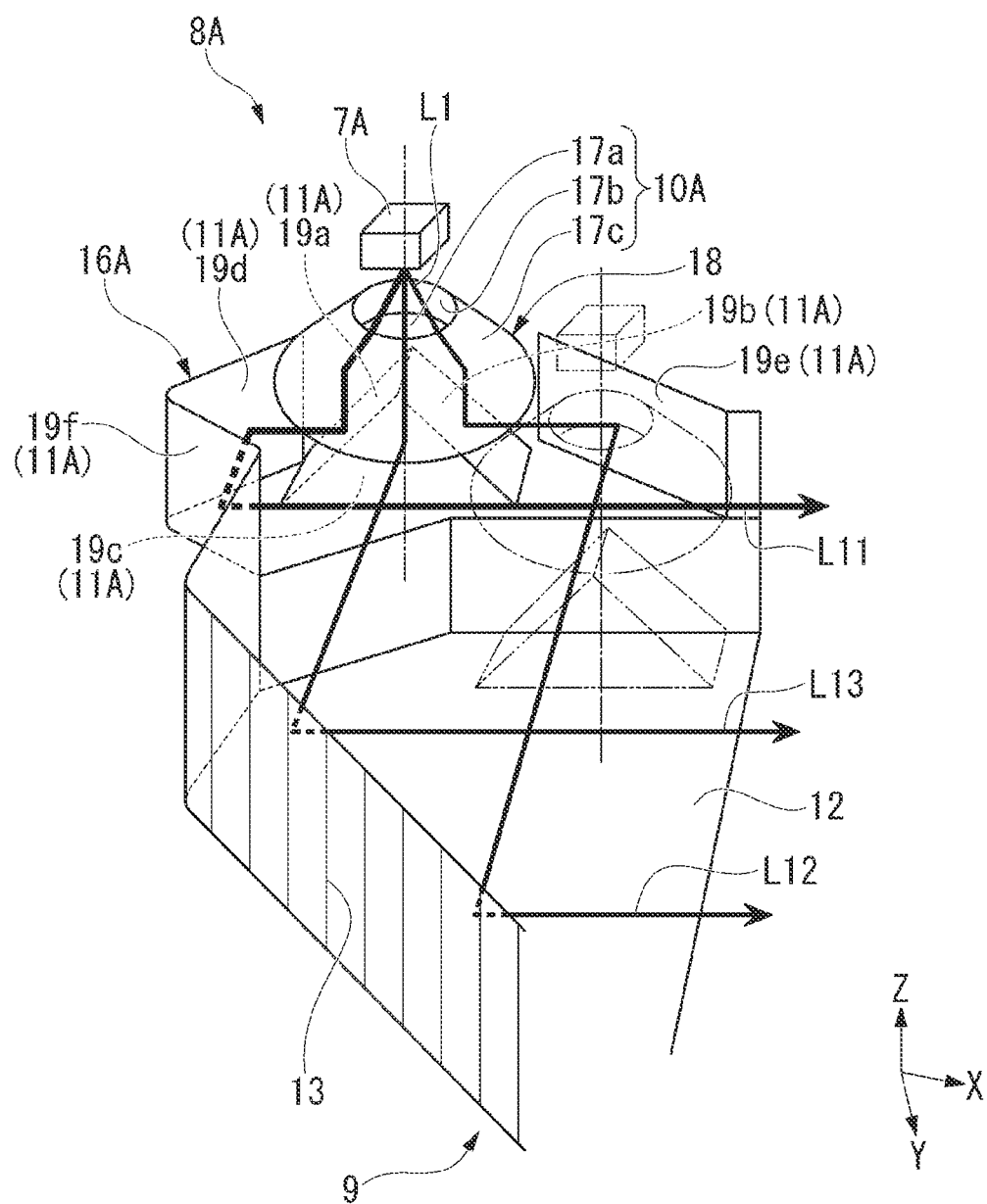
FIG. 4 is a perspective view showing an optical path of light emitted from a first light source of the first light guide lens section shown in FIG. 2.
Figure 5:
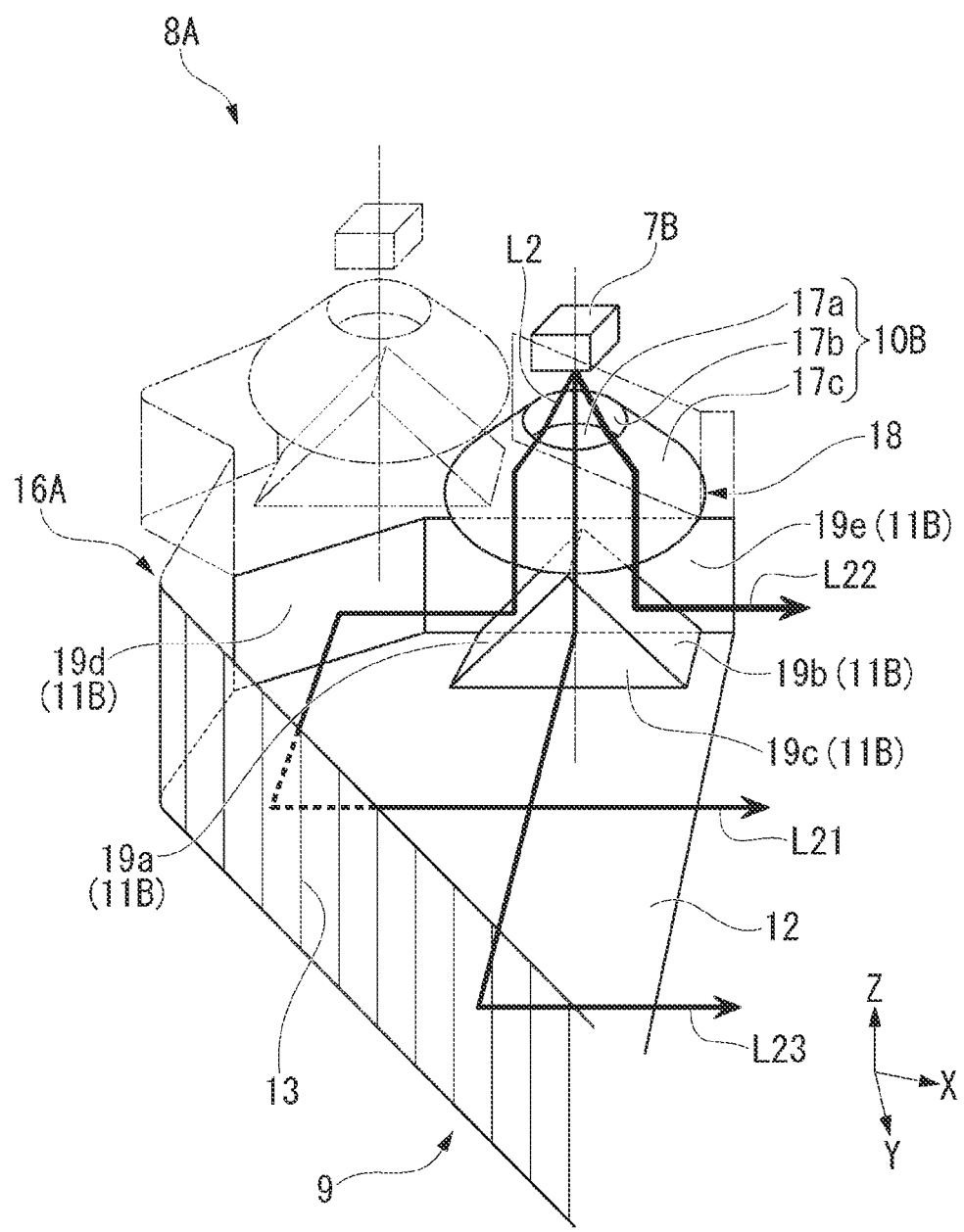
FIG. 5 is a perspective view showing an optical path of light emitted from a second light source of the first light guide lens section shown in FIG. 2.
Figure 6:
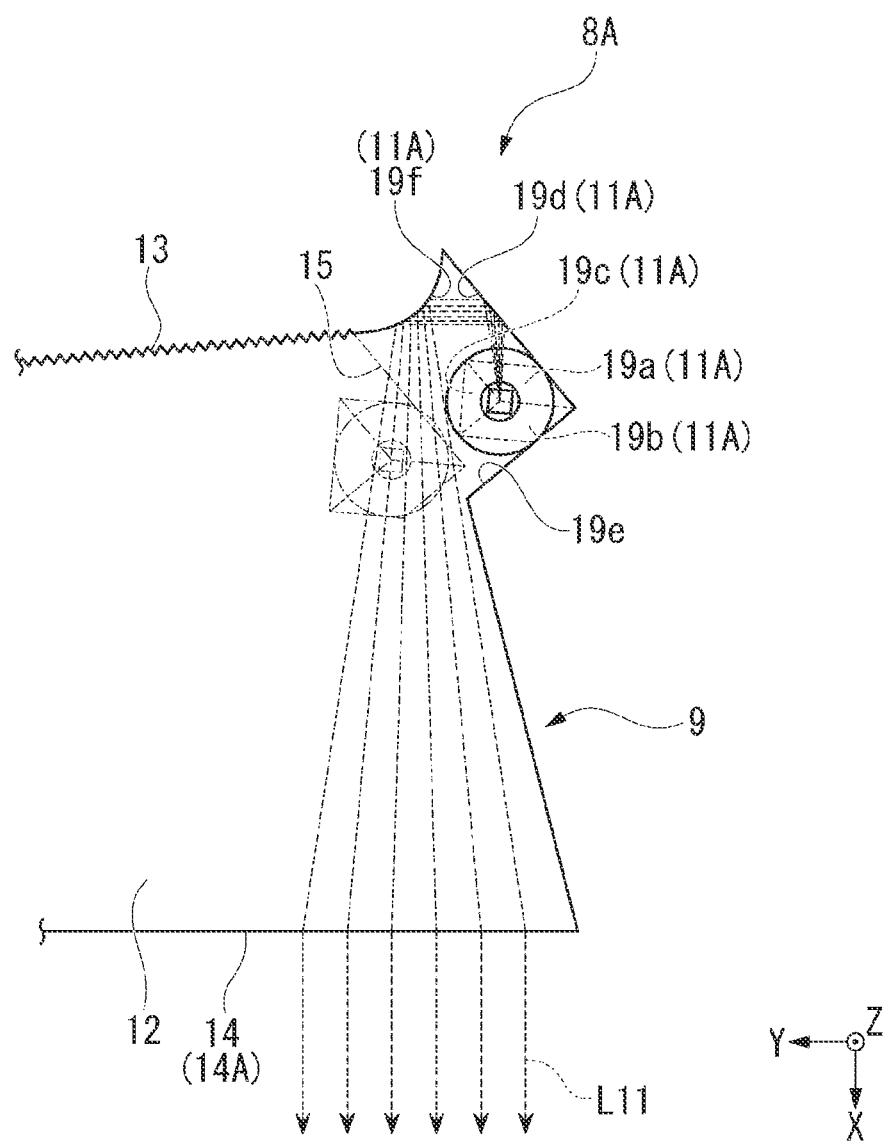
FIG. 6 is a plan view showing a configuration in which a sixth reflecting surface has a light diffusing shape.
Figure 7:
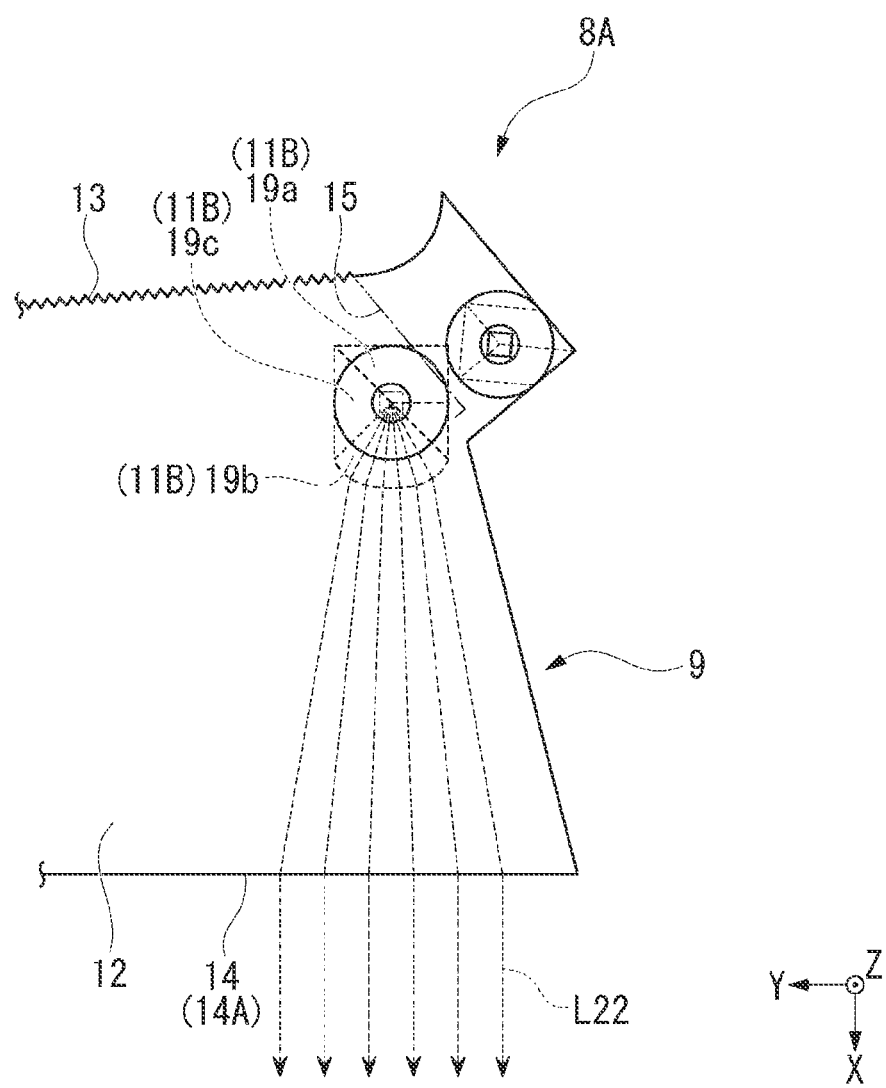
FIG. 7 is a plan view showing a configuration in which a second reflecting surface has a light diffusion shape.
Figure 8:
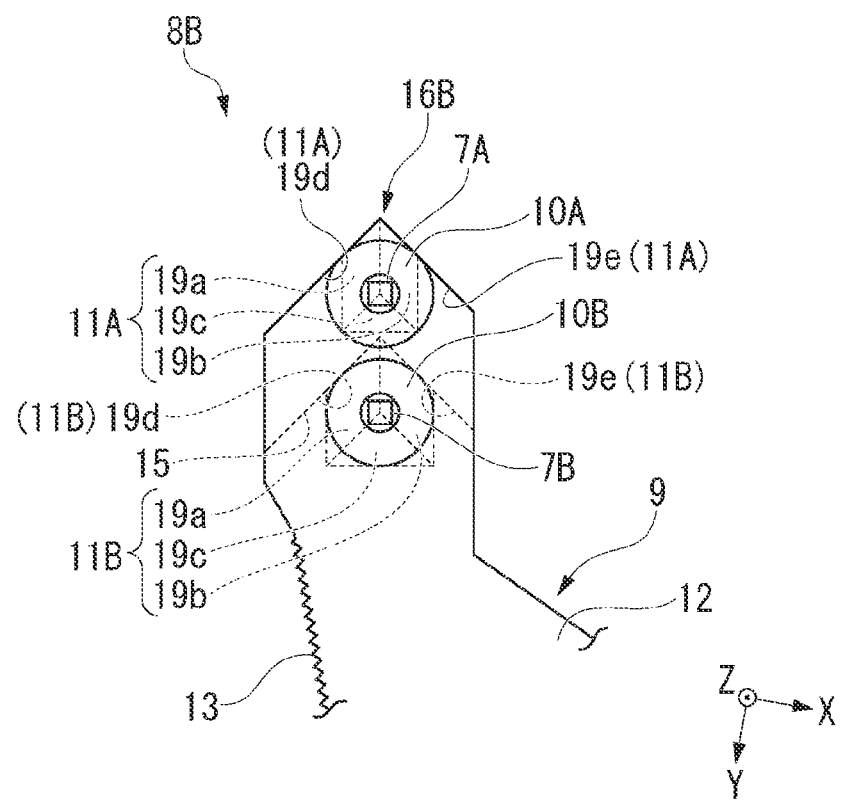
FIG. 8 is a plan view showing a configuration of the vehicle lamp on the side of a second light guide lens section shown in FIG. 1.
Figure 9:
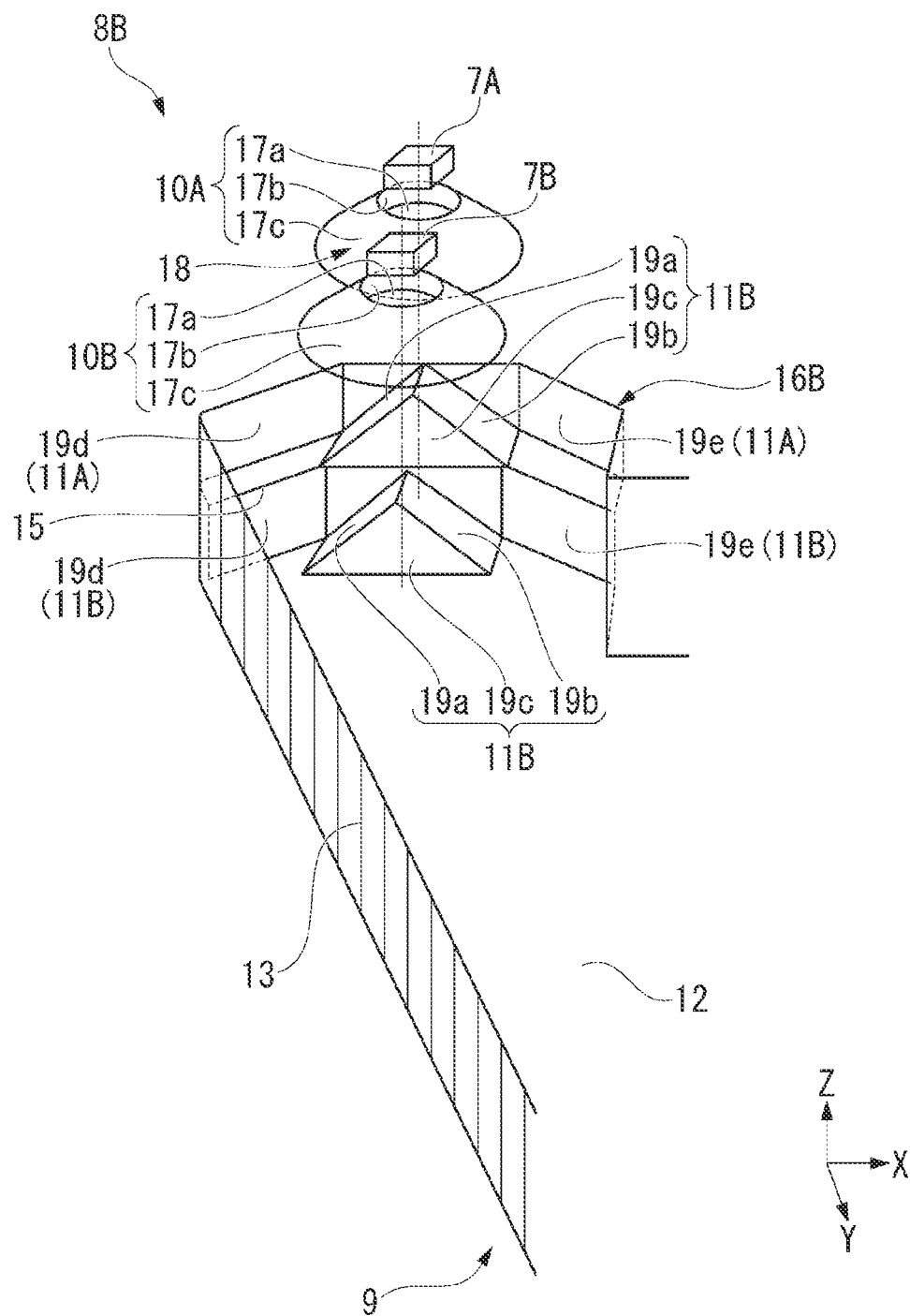
FIG. 9 is a perspective view showing the configuration of the second light guide lens section shown in FIG. 8.
Figure 10:
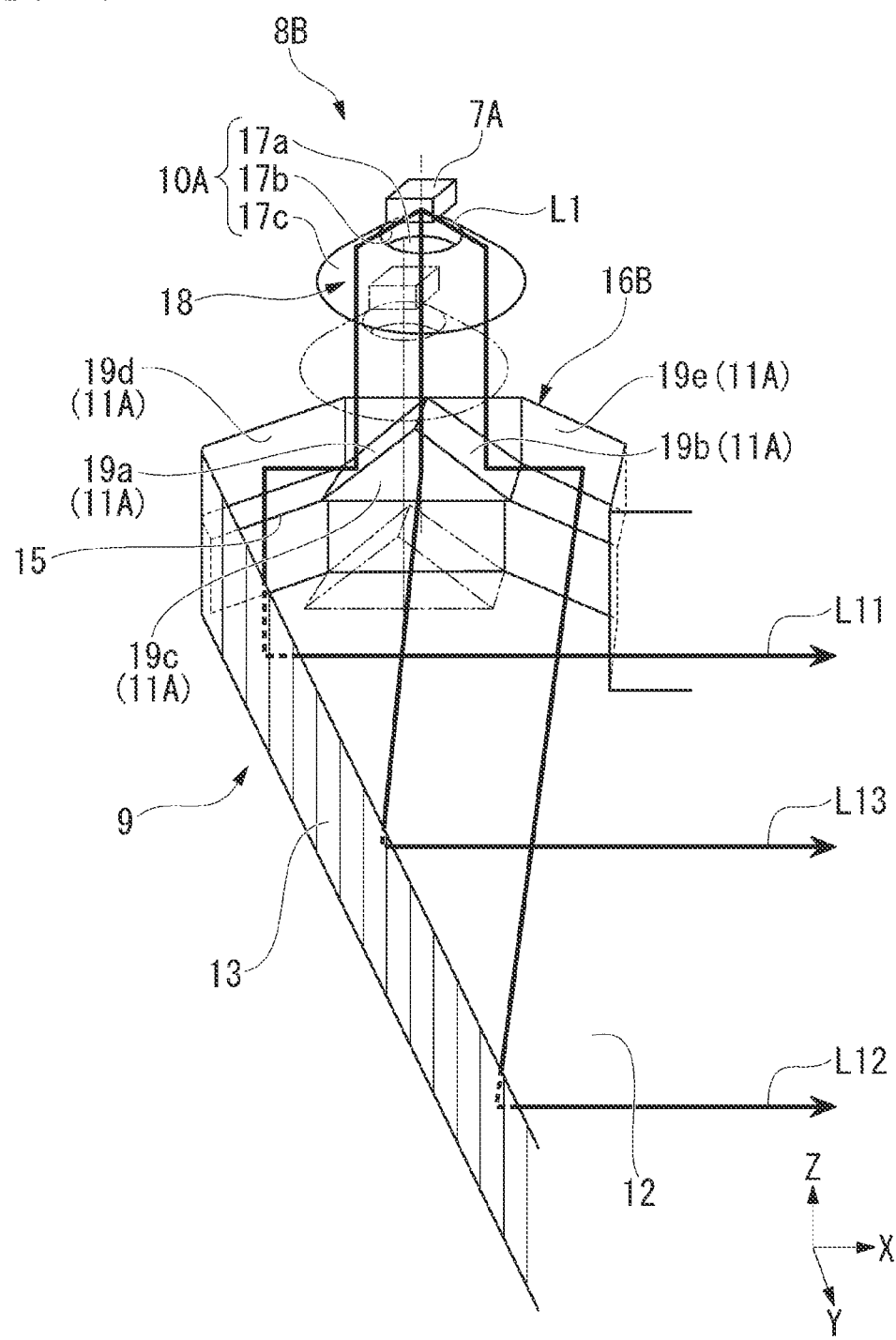
FIG. 10 is a perspective view showing an optical path of light emitted from a first light source of the second light guide lens section shown in FIG. 8.
Figure 11:
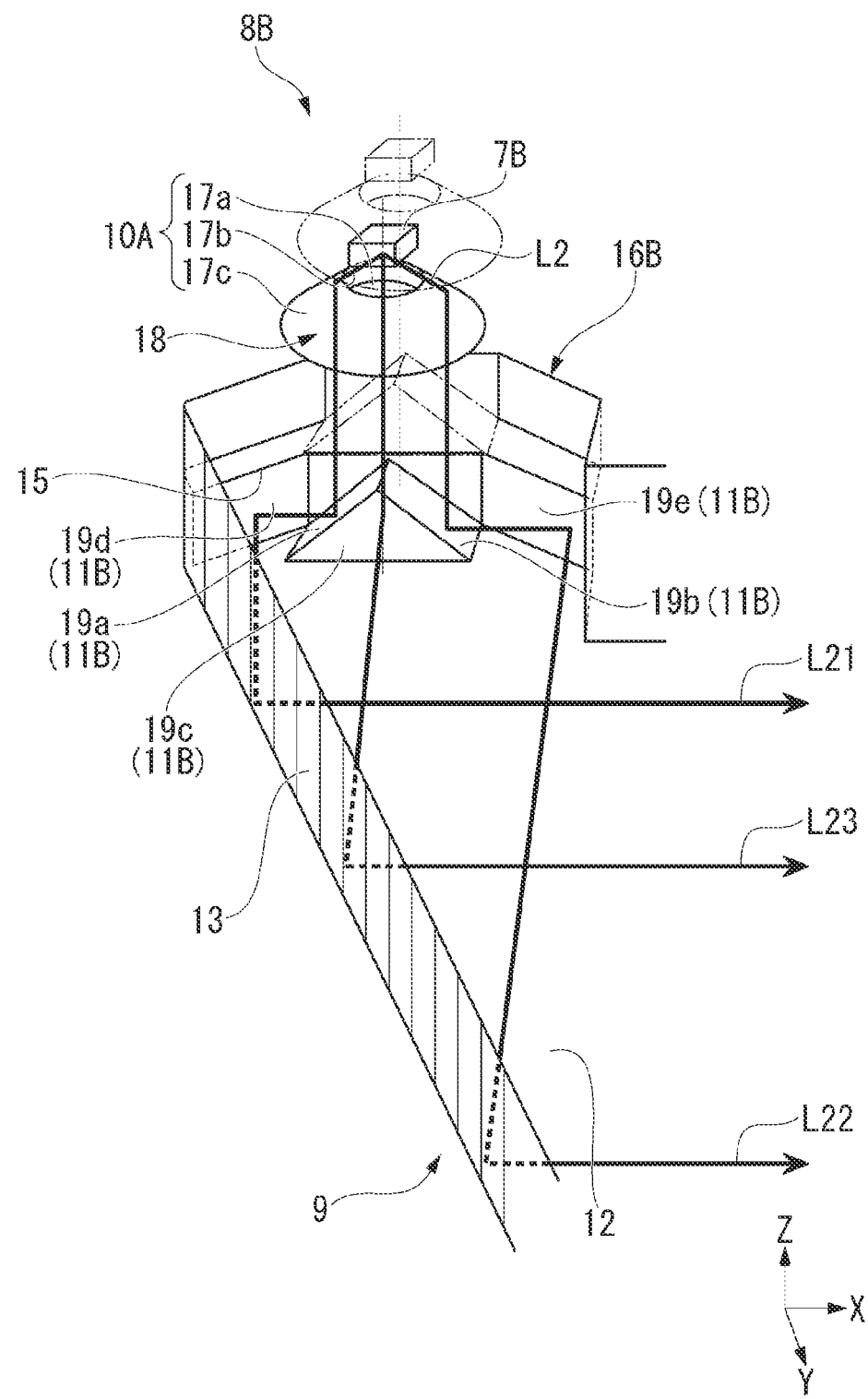
FIG. 11 is a perspective view showing an optical path of light emitted from a second light source of the second light guide lens section shown in FIG. 8.

Further, FIG. 1 is a plan view showing a configuration of the vehicle lamp 1 according to an embodiment of the present invention. FIG. 2 is a plan view showing a configuration of the vehicle lamp 1 on the side of a first light guide lens section shown in FIG. 1. FIG. 3 is a perspective view showing a configuration of the first light guide lens section shown in FIG. 2. FIG. 4 is a perspective view showing an optical path of light emitted from a first light source of the first light guide lens section shown in FIG. 2. FIG. 5 is a perspective view showing an optical path of light emitted from a second light source of the first light guide lens section shown in FIG. 2. FIG. 6 is a plan view showing a configuration in which a sixth reflecting surface has a light diffusion shape. FIG. 7 is a plan view showing a configuration in which a second reflecting surface has a light diffusion shape. FIG. 8 is a plan view showing a configuration of the vehicle lamp 1 on the side of a second light guide lens section shown in FIG. 1. FIG. 9 is a perspective view showing the configuration of the second light guide lens section. FIG. 10 is a perspective view showing an optical path of light emitted from a first light source of the second light guide lens section. FIG. 11 is a perspective view showing an optical path of light emitted from a second light source of the second light guide lens section.

In addition, in the following drawings, an XYZ orthogonal coordinates system is set, an X-axis direction indicates a forward/rearward direction (a lengthwise direction) of the vehicle lamp 1, a Y-axis direction indicates a leftward/rightward direction (a widthwise direction) of the vehicle lamp 1, and a Z-axis direction indicates an upward/downward direction (a height direction) of the vehicle lamp 1.

Further, in the following description, mentions of "forward," "rearward," "leftward," "rightward," "upward" and "downward" mean directions when the vehicle lamp 1 is seen from a front surface (a side in front of the vehicle) unless the context clearly indicates otherwise.

The vehicle lamps 1 of the embodiment are mounted on, for example, both corner portions of a front end side of a vehicle (not shown) (in the embodiment, a corner portion of a right front end side), and are constituted by position lamps and turn lamps in which width indicators (position lamps) configured to emit white light and direction indicators (turn lamps) configured to blink orange light are combined with each other.

Specifically, as shown in FIG. 1, the vehicle lamp 1 of the embodiment includes a lighting unit 2 that functions as a position lamp and a turn lamp.

The lighting unit 2 is disposed inside a lighting body 5 constituted by a housing 3 having a frontal surface (a front surface) that is open and a lens cover 4 configured to cover the housing 3 on the side of the front surface and having an opening section 4a corresponding to the lighting unit 2. In addition, a transparent outer lens 6 is attached to the opening section 4a of the lens cover 4.

The lighting unit 2 includes a plurality of (in the embodiment, two) first light sources 7A and a plurality of (in the embodiment, two) second light sources 7B, and a light guide body 9 including a plurality of (in the embodiment, two) light guide lens sections 8A and 8B. The first light source 7A and the second light source 7B are disposed on each of the light guide lens sections 8A and 8B neighboring each other.

The first light source 7A is constituted by an LED configured to emit white-colored light (hereinafter, simply referred to as light L1) as a light source for a position lamp. In addition, a high output (high brightness) type (for example, SMD LED or the like) for vehicle illumination is used in the LED. Each of the first light sources 7A is mounted on a lower surface side of a circuit board (not shown) on which a driving circuit configured to drive the LED is provided. Accordingly, each of the first light sources 7A radially emits the light L1 downward.

The second light source 7B is constituted by an LED configured to emit orange-colored light (hereinafter, simply referred to as light L2) as a light source for a turn lamp. In addition, a high output (high brightness) type for vehicle illumination (for example, SMD LED or the like) is used in the LED. Each of the second light sources 7B is mounted on a lower surface side of the same circuit board as the first light source 7A. Accordingly, each of the second light sources 7B radially emits the light L2 downward.

Further, while a configuration in which a plurality of LEDs that constitute the first light source 7A and the second light source 7B and a driving circuit configured to drive the plurality of LEDs are mounted on a circuit board is provided in the embodiment, a configuration may be provided in which a mounting board on which the plurality of LEDs are mounted is disposed separately from the circuit board on which the driving circuit configured to drive the plurality of LEDs is provided, the mounting board and the circuit board are electrically connected via a wiring cord referred to as a harness, and the driving circuit is protected from heat emitted from the plurality of LEDs.

The light guide body 9 is constituted by a flat plate-shaped light transmissive member. A material having a refractive index higher than air, for example, a transparent resin such as polycarbonate, acryl, or the like, glass, or the like, may be used in the light transmissive member.

Among the plurality of light guide lens sections 8A and 8B arranged in the vehicle width direction, the light guide body 9 includes a first light guide lens section 8A disposed on an inner side in a vehicle width direction and a second light guide lens section 8B disposed on an outer side in the vehicle width direction.

Each of the first light guide lens section 8A and the first light guide lens section 8B includes a first incidence section 10A and a second incidence section 10B, a first reflecting section 11A and a second reflecting section 11B, a light guide section 12, a light guide reflecting section 13 and an emission section 14, and the neighboring both of the light guide sections 12 are formed integrally, and each of the emission sections 14 consists a continuous emission section 14A in which both of the emission sections 14 are continuous with each other.

In addition, in the first and second light guide lens sections 8A and 8B, as shown in an enlarged manner in FIG. 2, FIG. 3, FIG. 8 and FIG. 9, the second light source 7B, the second incidence section 10B and the second reflecting section 11B are disposed closer to the light guide section 12 compared to the first light source 7A, the first incidence section 10A and the first reflecting section 11A.

In addition, a stepped section 15 is provided between the first reflecting section 11A and the second reflecting section 11B. The first reflecting section 11A is located above the stepped section 15 when seen from the side of the first incidence section 10A (from an upper side). Meanwhile, the second reflecting section 11B is located below the stepped section 15 when seen from the side of the second incidence section 10B (from the upper side).

The first incidence section 10A and the second incidence section 10B are disposed on the light guide body 9 on the side of one surface (in the embodiment, an upper surface) of the light guide body 9 so as to face the first light source 7A and the second light source 7B, respectively, which are adjacent to each other. In addition, the first and second incidence sections 10A and 10B are provided on extension sections 16A and 16B extending from a base end side of the respective light guide section 12 (inside in the vehicle width direction) corresponding to the light guide lens section 8A and the first light guide lens section 8B, respectively.

Both of the first and second incidence sections 10A and 10B has a first condensing incidence surface 17a having a convex surface shape disposed at a center of a portion facing the first or second light sources 7A and 7B and into which some of the lights L1 and L2 emitted from the first and second light sources 7A and 7B is incident, a second condensing incidence surface 17b disposed on an inner circumferential side of a protrusion section 18 protruding from a position surrounding the first condensing incidence surface 17a toward the first or second light source 7A and 7B and into which some of the lights L1 and L2 emitted from the first and second light sources 7A and 7B are incident, and a condensing reflecting surface 17c disposed on an outer circumferential side of the protrusion section 18 and configured to reflect the lights L1 and L2 entered from the second condensing incidence surface 17b.

In the first and second incidence sections 10A and 10B, among the lights L1 and L2 emitted from the first and second light sources 7A and 7B, the lights L1 and L2 entered from the first condensing incidence surfaces 17a are condensed closer to the optical axis. Meanwhile, the lights L1 and L2 entered from the second condensing incidence surfaces 17b are condensed closer to the optical axis by reflecting the lights using the condensing reflecting surfaces 17c.

Accordingly, in the first and second incidence sections 10A and 10B, the lights L1 and L2 radially emitted downward from the first and second light sources 7A and 7B are entered into the light guide body 9 while being parallelized or condensed.

Each of the first reflecting section 11A and the second reflecting section 11B includes a reflecting surface disposed on the other surface side (in the embodiment, a lower surface) of the light guide body 9 so as to face the first incidence section 10A and the second incidence section 10B that are disposed next to each other. In addition, each of the first and second reflecting sections 11A and 11B is provided on the extension sections 16A corresponding to the light guide lens section 8A and the first light guide lens section 8B, respectively.

As shown in FIG. 2, FIG. 3 and FIG. 4, at above the stepped section 15, the first reflecting section 11A that constitutes the first light guide lens section 8A includes a first reflecting surface 19a inclined toward a back surface side of the extension section 16A (the light guide body 9) with respect to an optical axis of the light L1 entered from the first incidence section 10A, a second reflecting surface 19b inclined toward a front surface side of the extension section 16A (the light guide body 9) with respect to an optical axis of the light L1 entered from the first incidence section 10A, and a third reflecting surface 19c inclined toward a tip side of the extension section 16A (the side of the light guide section 12) with respect to an optical axis of the light L1 entered from the first incidence section 10A.

That is, the first, second and third reflecting surfaces 19a, 19b and 19c are constituted by respective inclined surfaces of a concave prism formed on a lower surface of the extension section 16A. In addition, the first, second and third reflecting surfaces 19a, 19b and 19c are constituted by respective inclined surfaces inclined in respective directions about an optical axis of the light L1 incident from the first incidence section 10A.

At the concave prism of the first reflecting section 11A that constitutes the first light guide lens section 8A, among the light L1 entered from the first incidence section 10A, first light L11 entered into the first reflecting surface 19a is reflected toward the back surface side of the extension section 16A, second light L12 incident on the second reflecting surface 19b is reflected toward a front surface side of the extension section 16A, and third light L13 incident on the third reflecting surface 19c is reflected toward a back surface side of the light guide section 12.

In addition, the first reflecting section 11A that constitutes the first light guide lens section 8A includes a fourth reflecting surface 19d configured to reflect the first light L11 reflected by the first reflecting surface 19a toward a back surface side of the light guide section 12, a fifth reflecting surface 19e configured to reflect the second light L12 reflected by the second reflecting surface 19b toward a back surface side of the light guide section 12, and a sixth reflecting surface 19f configured to reflect some of the first light L11 reflected by the fourth reflecting surface 19d toward a front surface side of the light guide section 12.

That is, the fourth, fifth and sixth reflecting surfaces 19d, 19e and 19f are constituted by each side surfaces that form an outline of the extension section 16A. At above the stepped section 15, the extension section 16A has a shape partitioned by the fourth, fifth and sixth reflecting surfaces 19d, 19e and 19f.

In addition, for example, as shown in FIG. 6, the sixth reflecting surface 19f may have a light diffusion shape that reflects the first light L11 incident on the sixth reflecting surface 19f while diffusing the light.

Specifically, the sixth reflecting surface 19f shown in FIG. 6 is constituted by a curved convex surface. Accordingly, in the first reflecting section 11A that constitutes the first light guide lens section 8A, the first light L11 incident on the sixth reflecting surface 19f can be reflected while being diffused toward a front surface side of the light guide section 12.

As shown in FIG. 2, FIG. 3 and FIG. 5, at below the stepped section 15, the second reflecting section 11B that constitutes the first light guide lens section 8A includes the first reflecting surface 19a inclined toward a back surface side of the extension section 16A (the light guide body 9) with respect to the optical axis of the light L2 entered from the second incidence section 10B, the second reflecting surface 19b inclined toward a front surface side of the extension section 16A (the light guide body 9) with respect to the optical axis of the light L2 entered from the second incidence section 10B, and the third reflecting surface 19c inclined toward a tip side of the extension section 16A (the light guide section 12) with respect to the optical axis of the light L2 entered from the second incidence section 10B.

That is, the first, second and third reflecting surfaces 19a, 19b and 19c are constituted by respective inclined surfaces of a concave prism formed on lower surfaces of the extension section 16A and the light guide section 12. In addition, the first, second and third reflecting surfaces 19a, 19b and 19c are constituted by respective inclined surfaces inclined in respective directions about an optical axis of the light L2 incident from the second incidence section 10B.

At the second reflecting section 11B that constitutes the first light guide lens section 8A, among the light L2 entered from the second incidence section 10B, fourth light L21 entered on the first reflecting surface 19a is reflected toward a back surface side of the extension section 16A, fifth light L22 incident on the second reflecting surface 19b is reflected toward a front surface side of the light guide section 12, and sixth light L23 incident on the third reflecting surface 19c is reflected toward a back surface side of the light guide section 12.

In addition, the second reflecting section 11B that constitutes the first light guide lens section 8A includes the fourth reflecting surface 19d configured to reflect the fourth light L21 reflected by the first reflecting surface 19a toward a back surface side of the light guide section 12, and the fifth reflecting surface 19e configured to reflect the fifth light L22 reflected by the second reflecting surface 19b toward a back surface side of the light guide section 12.

That is, the fourth and fifth reflecting surfaces 19d and 19e are constituted by each side surfaces that form an outline of the extension section 16A. At below the stepped section 15, the extension section 16A has a shape partitioned by the fourth and fifth reflecting surfaces 19d and 19e.

In addition, for example, as shown in FIG. 7, the second reflecting surface 19b may be configured to have a light diffusion shape that reflects and diffuses the fifth light L22 incident on the second reflecting surface 19b.

Specifically, the second reflecting surface 19b shown in FIG. 7 is constituted by a curved convex surface. Accordingly, in the second reflecting section 11B that constitutes the first light guide lens section 8A, the fifth light L22 incident on the second reflecting surface 19b can be reflected and diffused toward a front surface side of the light guide section 12.

As shown in FIG. 8, FIG. 9 and FIG. 10, at above the stepped section 15, the first reflecting section 11A that constitutes the second light guide lens section 8B includes the first reflecting surface 19a inclined toward a back surface side of the extension section 16B (the light guide body 9) with respect to an optical axis of the light L1 entered from the first incidence section 10A, the second reflecting surface 19b inclined toward a front surface side of the extension section 16B (the light guide body 9) with respect to an optical axis of the light L1 entered from the first incidence section 10A, and the third reflecting surface 19c inclined toward a tip side of the extension section 16B (on the side of the light guide section 12) with respect to an optical axis of the light L1 entered from the first incidence section 10A.

That is, the first, second and third reflecting surfaces 19a, 19b and 19c are constituted by respective inclined surfaces of a concave prism formed by a lower surface of the extension section 16B. In addition, the first, second and third reflecting surfaces 19a, 19b and 19c are constituted by respective inclined surfaces inclined in respective directions about an optical axis of the light L1 incident from the first incidence section 10A.

In the first reflecting section 11A that constitutes the second light guide lens section 8B, among the light L1 entered from the first incidence section 10A, the first light L11 incident on the first reflecting surface 19a is reflected toward a back surface side of the extension section 16B, the second light L12 incident on the second reflecting surface 19b is reflected toward a front surface side of the extension section 16B, and the third light L13 incident on the third reflecting surface 19c is reflected toward a back surface side of the light guide section 12.

In addition, the first reflecting section 11A that constitutes the second light guide lens section 8B includes the fourth reflecting surface 19d configured to reflect the first light L11 reflected by the first reflecting surface 19a toward a back surface side of the light guide section 12, and the fifth reflecting surface 19e configured to reflect the second light L12 reflected by the second reflecting surface 19b toward a back surface side of the light guide section 12.

That is, the fourth and fifth reflecting surfaces 19d and 19e are constituted by each side surfaces that form an outline of the extension section 16B. At above the stepped section 15, the extension section 16B has a shape partitioned by the fourth and fifth reflecting surfaces 19d and 19e.

As shown in FIG. 8, FIG. 9 and FIG. 11, at below the stepped section 15, the second reflecting section 11B that constitutes the second light guide lens section 8B includes the first reflecting surface 19a inclined toward a back surface side of the extension section 16B (the light guide body 9) with respect to an optical axis of the light L2 entered from the second incidence section 10B, the second reflecting surface 19b inclined toward a front surface of the extension section 16B (the light guide body 9) with respect to an optical axis of the light L2 entered from the second incidence section 10B, and the third reflecting surface 19c inclined toward a tip side of the extension section 16B (the side of the light guide section 12) with respect to an optical axis of the light L2 entered from the second incidence section 10B.

That is, the first, second and third reflecting surfaces 19a, 19b and 19c are constituted by respective inclined surfaces of a concave prism formed on a lower surface of the extension section 16B. In addition, the first, second and third reflecting surfaces 19a, 19b and 19c are constituted by respective inclined surfaces inclined in respective directions about an optical axis of the light L2 incident from the second incidence section 10B.

In the second reflecting section 11B that constitutes the second light guide lens section 8B, among the light L2 entered from the second incidence section 10B, the fourth light L21 incident on the first reflecting surface 19a is reflected toward a back surface side of the extension section 16B, the fifth light L22 incident on the second reflecting surface 19b is reflected toward a front surface side of the extension section 16B, and the sixth light L23 incident on the third reflecting surface 19c is reflected toward a back surface side of the light guide section 12.

In addition, the second reflecting section 11B that constitutes the second light guide lens section 8B includes the fourth reflecting surface 19d configured to reflect the fourth light L21 reflected by the first reflecting surface 19a toward a back surface side of the light guide section 12, and the fifth reflecting surface 19e configured to reflect the fifth light L22 reflected by the second reflecting surface 19b toward a back surface side of the light guide section 12.

That is, the fourth and fifth reflecting surfaces 19d and 19e are constituted by each side surfaces that form an outline of the extension section 16B. At below the stepped section 15, the extension section 16B has a shape partitioned by the fourth and fifth reflecting surfaces 19d and 19e.

The light guide section 12 is a portion that guides the lights L1 and L2 reflected by the first and second reflecting sections 11A and 11B, and has a shape, a back surface of which is inclined toward a front surface side from a base end side thereof toward a tip side thereof. In addition, an inclined surface of the light guide section 12 on the side of the back surface is disposed at a position on which the lights L1 and L2 are incident on tip sides of the extension sections 16A and 16B.

In the light guide section 12, while guiding the lights L1 and L2 reflected at the first and second reflecting sections 11A and 11B inside the light guide section 12, the lights L1 and L2 reflected by the light guide reflecting section 13 provided on the back surface side is emitted toward the outside from the emission section 14 on the front surface side of the light guide section 12.

The light guide reflecting section 13 is constituted by a plurality of reflection cuts configured to reflect the lights L1 and L2 incident on the back surface of the light guide section 12 at an angle that is smaller than a critical angle with respect to the front surface of the light guide section 12. Further, shapes, sizes, and the numbers of the plurality of reflection cuts are not particularly limited. For example, the light guide reflecting section 13 of the embodiment is configured by periodically arranging substantially V-shaped groove sections obtained by cutting out the back surface of the light guide section 12 in an upward/downward direction as the plurality of reflection cuts. Further, the light guide reflecting section 13 may be constituted by flat reflecting surfaces that does not have the reflection cuts, on which the lights L1 and L2 are incident on an inclined surface of the light guide section 12 on the back surface side.

Further, in the lighting unit 2, a reflector facing the back surface of the light guide section 12 may be configured. Accordingly, the light emitted to the outside from the back surface side of the light guide section 12 can be reflected by the reflector, and can be incident into the light guide section 12 from the side of the back surface thereof again.

The emission sections 14 of the first and second light guide lens sections 8A and 8B constitute the continuous emission section 14A that is continuous in the vehicle width direction. The continuous emission section 14A is constituted by a flat surface. In the lighting unit 2, by using the lights L1 and L2 emitted from the continuous emission section 14, the continuous emission section 14 can emit light in a linear shape as the light emitting section.

Further, the continuous emission section 14A can also have a shape inclined in a direction in which an outer side is retracted more than an inner side at least in the vehicle width direction, or a shape curved in a direction in which an outer side is retracted more than an inner side in the vehicle width direction according to a slant shape applied to a corner portion of the vehicle on the side of the front end.

In the vehicle lamp 1 of the embodiment having the above-mentioned configuration, even when the lights L1 and L2 emitted from the first light source 7A and the second light source 7B adjacent to each other are made to enter the light guide body 9 from different positions of the light guide body 9, the lights L1 and L2 can be emitted from same position of the light guide body 9.

Accordingly, in the vehicle lamp 1 of the embodiment, when emission of the lights L1 and L2 is switched between the first light source 7A and the second light source 7B having different colored lights, it is possible to prevent positional deviation of a bright spot of each luminescent color when the continuous emission section 14A is seen from the side of the front surface.

In addition, in the vehicle lamp 1 of the embodiment, at the inner most portion in the vehicle width direction, in above mentioned the first light guide lens section 8A, the first light L11 incident on the sixth reflecting surface 19f of the first reflecting section 11A is reflected toward the front surface side of the light guide section 12, and the fifth light L22 incident on the second reflecting surface 19b of the second reflecting section 11B is reflected toward the front surface side of the light guide section 12. In addition, the extension section 16B of the second light guide lens section 8B is disposed behind the first light guide lens section 8A.

In the case of the configuration, in comparison with the case in which the entire light guide lens section is used as the second light guide lens section 8B, an emission area of the emission section 14A can be enlarged at inner side in the vehicle width direction. Accordingly, in the vehicle lamp 1 of the embodiment, it is possible to make the continuous emission section 14A uniformly emit light throughout the entire region in the vehicle width direction by arranging and disposing the first light guide lens section 8A at inner side in the vehicle width direction and the second light guide lens section 8B at outer side in the vehicle width direction next to each other. Further, the second light guide lens section 8B disposed on the outer side in the vehicle width direction and the light guide section 12 is not limited to one, but may be plural in one light guide body 9, and these may be continuously integrally formed.

Further, the present invention is not particularly limited to the embodiment, and various modifications may be made without departing from the scope of the present invention.

For example, while the vehicle lamps 1 mounted on both corner portions on a front end side of the vehicle is exemplified as being constituted by position lamps and turn lamps in which width indicators (position lamps) configured to emit white light and direction indicators (turn lamps) configured to flicker emission of orange light are combined in the embodiment, the present invention can also be applied as the vehicle lamps mounted on both corner portions on a rear end side of the vehicle constituted by tail lamps and turn lamps in which taillights (tail lamps) configured to emit red light and direction indicators (turn lamps) configured to flicker emission of orange light are combined.

Further, according to laws and regulations of countries, during flickering (turning on) of the turn lamps, it is possible to keep the position lamp or the tail lamp on, or turn off the position lamp or the tail lamp.

In addition, while the case in which the first light source 7A and the second light source 7B having different colored lights are used is exemplified in the embodiment, the present invention can also be applied to a vehicle lamp using the first light source 7A and the second light source 7B having the same colored light. In addition, it is possible to switch between lighting only one of the first light source 7A and the second light source 7B or lighting both of them.

In addition, in the vehicle lamp to which the present invention is applicable, when the first light source 7A and the second light source 7B having the same colored light are used, for example, the present invention can be widely applied to a vehicle lamp such as a headlight (head lamp) for a vehicle, a width indicator (position lamp), a subsidiary headlight (sub-head lamp), a front (rear) fog light (fog lamp), a day running light (DRL), a lid lamp, a taillight (a tail lamp), a brake lamp (a stop lamp), a back lamp, a direction indicator (a winker lamp), or the like.

In addition, the first light source 7A and the second light source 7B may radially emit light or may use a light emitting element such as a laser diode (LD) or the like, in addition to the above-mentioned LED. In addition, the color of the light emitted from the light emitting element can also be changed as appropriate according to the application, such as white-colored light, rod-colored light, orange-colored light, or the like.

In addition, while the vehicle lamp 1 has a configuration in which the first incidence section 10A and the first reflecting section 11A, and the second incidence section 10B and the second reflecting section 11B of the light guide body 9 are disposed at different height positions via the stepped section 15 to correspond to the first light source 7A and the second light source 7B next to each other, the lamps may be provided throughout a plurality of stages using such a configuration as a constitution unit. For example, when the number of the light sources is three, it is possible to provide the stepped sections 15 as two stages, and to arrange the incidence section and the reflecting section corresponding to the respective light sources at different height positions.

In addition, in the vehicle lamp 1, while the case in which the light guide body 9 is used is exemplified, according to a design or the like of the actual vehicle, a shape or the like of the light guide body 9 can be appropriately changed. For example, while the light guide body 9 has the configuration including the one first light guide lens section 8A and the one light guide lens section 8B, the number and an arrangement order of the first and second light guide lens sections 8A and 8B can be changed as appropriate.

REFERENCE SIGNS LIST

1 Vehicle lamp
2 Lighting unit
3 Housing
4 Lens cover
5 Lighting body
6 Outer lens
7A First light source
7B Second light source
8A First light guide lens section
8B Second light guide lens section
9 Light guide body
10A First incidence section
10B Second incidence section
11A First reflecting section
11B Second reflecting section
12 Light guide section
13 Light guide reflecting section
14 Emission section
14A Continuous emission section
15 Stepped section
16A, 16B Extension section
19*a* First reflecting surface
19*b* Second reflecting surface
19*c* Third reflecting surface
19*d* Fourth reflecting surface
19*e* Fifth reflecting surface
19*f* Sixth reflecting surface
L1 White-colored the light
L2 Orange-colored the light
L11 The first light
L12 The second light
L13 Third the light
L21 Fourth the light
L22 Fifth the light
L23 Sixth light

What is claimed is:

1. A vehicle lamp comprising:
a first light source and a second light source disposed next to each other; and
a light guide body configured to guide light from the first light source and the second light source in a same direction with each other,
wherein the light guide body includes:
a first incidence section and a second incidence section that are disposed to face the first light source and the second light source, respectively, and from which light emitted from the first light source and the second light source enters inside;
a first reflecting section and a second reflecting section that are disposed to face the first incidence section and the second incidence section, respectively, and that are configured to reflect the light entered from the first incidence section and the second incidence section;
a light guide section configured to guide the light reflected at the first reflecting section and the second reflecting section;
a light guide reflecting section that is disposed on a back surface side of the light guide section and that is configured to reflect the light reflected at the first reflecting section and the second reflecting section toward a front surface side of the light guide section; and
an emission section that is disposed at the front surface side of the light guide section and that is configured to emit the light reflected at the light guide reflecting section to an outside,
the second light source, the second incidence section and the second reflecting section are disposed closer to the light guide section compared to the first light source, the first incidence section and the first reflecting section,
a stepped section is provided between the first reflecting section and the second reflecting section, and
when seen from a side of the first incidence section and a side of the second incidence section, the first reflecting section is disposed at above the stepped section and the second reflecting section is disposed at below the stepped section.

2. The vehicle lamp according to claim 1, wherein the first reflecting section includes a first reflecting surface inclined toward the back surface side of the light guide body with respect to an optical axis of light entered from the first incidence section, a second reflecting surface inclined toward a front surface side of the light guide body with respect to the optical axis of light entered from the first incidence section and a third reflecting surface inclined toward the light guide section with respect to the optical axis of light entered from the first incidence section, and
among the light entered from the first incidence section, first light entered the first reflecting surface is reflected toward the back surface side of the light guide body, second light entered the second reflecting surface is reflected toward the front surface side of the light guide body, and third light entered the third reflecting surface is reflected toward the back surface side of the light guide section.

3. The vehicle lamp according to claim 2, wherein the first reflecting section includes a fourth reflecting surface configured to reflect the first light reflected at the first reflecting surface toward the back surface side of the light guide section, and a fifth reflecting surface configured to reflect the second light reflected by the second reflecting surface toward the back surface side of the light guide section.

4. The vehicle lamp according to claim 3, wherein the first reflecting section includes a sixth reflecting surface configured to reflect some of the first light reflected at the fourth reflecting surface toward the front surface side of the light guide section.

5. The vehicle lamp according to claim 4, wherein the sixth reflecting surface has a light diffusion shape configured to reflect and diffuse the first light entered the sixth reflecting surface.

6. The vehicle lamp according to claim 1, wherein the second reflecting section includes a first reflecting surface inclined toward the back surface side of the light guide body with respect to an optical axis of light entered from the second incidence section, a second reflecting surface inclined toward the front surface side of the light guide body with respect to the optical axis of light entered from the second incidence section, and a third reflecting surface inclined toward the light guide section with respect to the optical axis of light incident from the second incidence section.

7. The vehicle lamp according to claim 6, wherein, among the light entered from the second incidence section, fourth light entered the first reflecting surface is reflected toward the back surface side of the light guide body, fifth light entered the second reflecting surface is reflected toward a front surface side of the light guide body, and sixth light entered the third reflecting surface is reflected toward the back surface side of the light guide section.

8. The vehicle lamp according to claim 7, wherein the second reflecting section includes a fourth reflecting surface configured to reflect fourth light reflected at the first reflecting surface toward the back surface side of the light guide section, and a fifth reflecting surface configured to reflect fifth light reflected at the second reflecting surface toward the back surface side of the light guide section.

9. The vehicle lamp according to claim 6, wherein, among the light entered from the second incidence section, fourth light entered the first reflecting surface is reflected toward the back surface side of the light guide body, fifth light entered the second reflecting surface is reflected toward the front surface side of the light guide body, and sixth light entered the third reflecting surface is reflected toward the back surface side of the light guide section.

10. The vehicle lamp according to claim 9, wherein the second reflecting surface has a light diffusion shape configured to reflect and diffuse the fifth light entered the second reflecting surface.

11. The vehicle lamp according to claim 1, wherein the first light source and the second light source emit colored lights different from each other.

12. The vehicle lamp according to claim 1, wherein the light guide body has a plurality of light guide lens sections including the first and second incidence sections, the first and second reflecting sections, the light guide section, the light guide reflecting section, and the emission section, and the plurality of light guide lens sections constitute a continuous emission section in which the neighboring light guide sections are formed integrally and the respective emission sections are made continuous with each other in a state the plurality of light guide lens are arranged in a vehicle width direction.

\* \* \* \* \*